United States Patent
Arie et al.

(10) Patent No.: US 8,855,328 B2
(45) Date of Patent: Oct. 7, 2014

(54) EARPIECE AND A METHOD FOR PLAYING A STEREO AND A MONO SIGNAL

(75) Inventors: Heiman Arie, Ra'Anna (IL); Uri Yehuday, Bat Yam (IL)

(73) Assignee: Bone Tone Communications Ltd., Road Town (VG)

( * ) Notice: Subject to any disclaimer, the term of this patent is extended or adjusted under 35 U.S.C. 154(b) by 440 days.

(21) Appl. No.: 13/128,238

(22) PCT Filed: Nov. 10, 2009

(86) PCT No.: PCT/IL2009/001053
§ 371 (c)(1),
(2), (4) Date: Aug. 23, 2011

(87) PCT Pub. No.: WO2010/052720
PCT Pub. Date: May 14, 2010

(65) Prior Publication Data
US 2011/0293105 A1 Dec. 1, 2011

Related U.S. Application Data

(60) Provisional application No. 61/112,785, filed on Nov. 10, 2008.

(51) Int. Cl.
*G10K 11/16* (2006.01)
*H03F 99/00* (2009.01)
*H04R 1/10* (2006.01)
*H04R 5/04* (2006.01)
*H04M 1/215* (2006.01)
*H04M 1/60* (2006.01)
*H04M 1/725* (2006.01)
*H04M 1/05* (2006.01)

(52) U.S. Cl.
CPC ............... *H04R 1/1083* (2013.01); *H04R 5/04* (2013.01); *H04M 1/2155* (2013.01); *H04M 1/60* (2013.01); *H04R 2460/13* (2013.01); *H04M 1/72591* (2013.01); *H04R 1/1016* (2013.01); *H04R 2460/01* (2013.01); *H04M 1/05* (2013.01)
USPC ....... 381/71.11; 381/380; 381/23.1; 381/328; 381/71.6

(58) Field of Classification Search
CPC ...... H04R 1/10; H04R 1/1016; H04R 1/1083; H04R 5/033; H04R 2460/13; H04R 2201/103
USPC ............... 381/71.11, 380, 71.6, 328, 151, 25; 623/10
See application file for complete search history.

(56) References Cited

U.S. PATENT DOCUMENTS

| | | | |
|---|---|---|---|
| 5,251,263 A | | 10/1993 | Andrea et al. |
| 5,323,468 A * | | 6/1994 | Bottesch ........................ 381/151 |
| 5,426,719 A * | | 6/1995 | Franks et al. ................. 704/228 |
| 7,072,476 B2 | | 7/2006 | White et al. |
| 8,254,591 B2 * | | 8/2012 | Goldstein et al. ............... 381/74 |
| 8,325,964 B2 * | | 12/2012 | Weisman ....................... 381/380 |
| 8,526,645 B2 * | | 9/2013 | Boillot et al. .................. 381/309 |
| 2007/0274531 A1 * | | 11/2007 | Camp ............................ 381/74 |

FOREIGN PATENT DOCUMENTS

| | | |
|---|---|---|
| KR | 100 643 311 B1 | 10/2006 |
| WO | WO2007-046435 A1 | 4/2007 |
| WO | WO2007/107985 | 9/2007 |

OTHER PUBLICATIONS

Japanese Patent Office, Office action for application No. 2011-535208.
European Patent Office, Communication with extended European search report, in Application No. 09824499.9, dated Jan. 8, 2014. (7 pages).
European Patent Office, Communication with extended European search report, in Application No. 09824499.9, dated Jan. 14, 2008. (7 pages).

* cited by examiner

*Primary Examiner* — Davetta W Goins
*Assistant Examiner* — Oyesola C Ojo

(74) *Attorney, Agent, or Firm* — Oren Reches

(57) ABSTRACT

An earpiece for providing an audio signal to two ears of a user, includes an audio interface for providing the audio signal, a bone conduction speaker coupled to the audio interface for outputting an output signal, an adaptive filter with an adjustable impulse response to provide a filtered signal that once played to the second ear of a user, by an in-ear speaker, reduces an audio effect of the leakage signal on the second ear of the user, an in-ear speaker coupled to the audio interface for providing an in-ear audio signal to the second ear of the user, in response to the filtered signal and the second input signal, an in-ear microphone for sensing a sensed audio signal, and a processor for updating an impulse response of the adaptive filter in order to reduce a contribution of the leakage signal to the sensed audio signal.

32 Claims, 10 Drawing Sheets

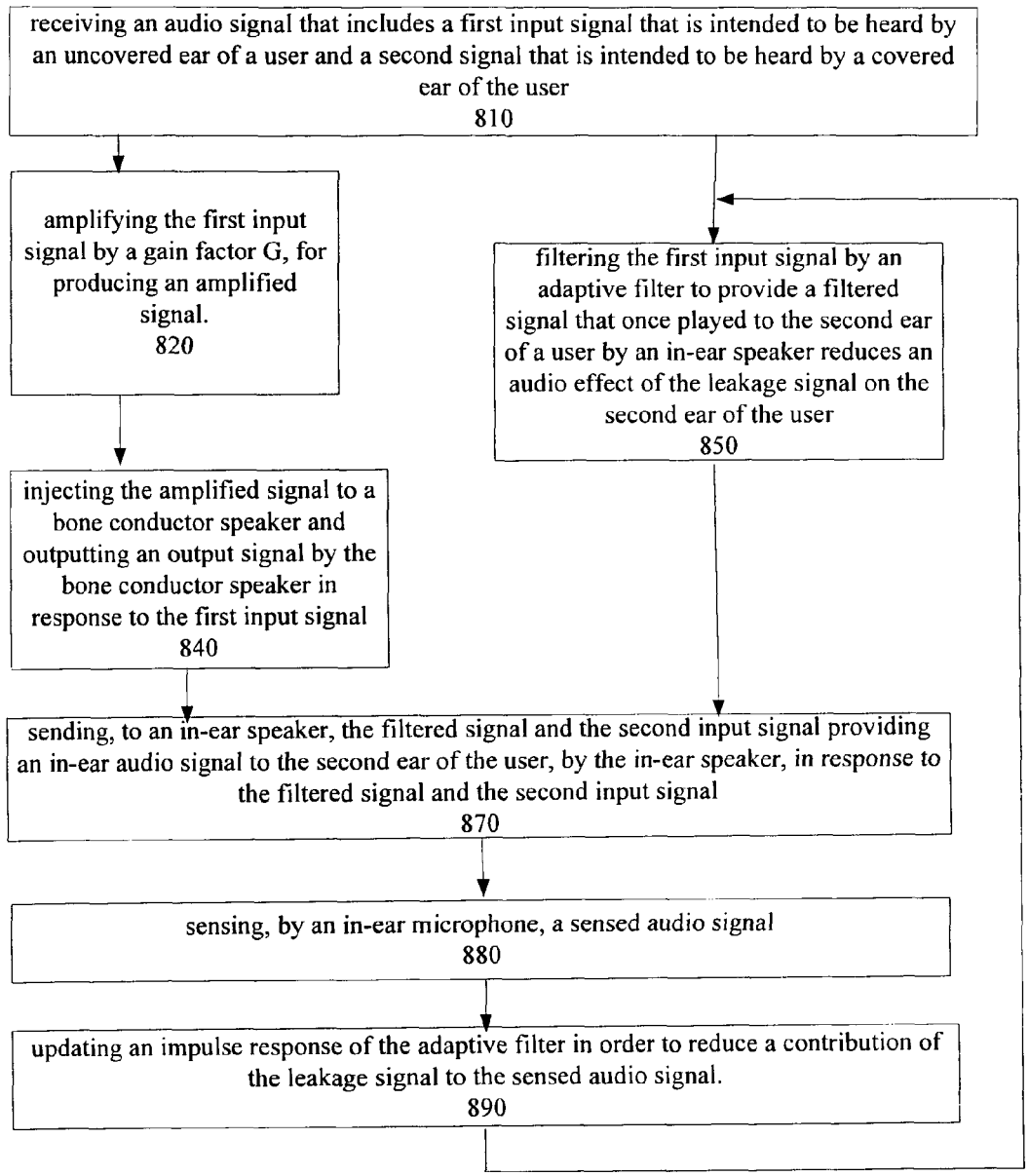

```
┌─────────────────────────────────────────────────────────────────────────┐
│ receiving an input signal that includes a first input signal and a second input signal. The │
│   first input signal can be the same as the second input in case it is a mono signal.        │
│                                      910                                                      │
└─────────────────────────────────────────────────────────────────────────┘
                                        │
                                        ▼
┌─────────────────────────────────────────────────────────────────────────┐
│         sending the first input signal to a first ear by a bone conduction speaker           │
│                                      920                                                      │
└─────────────────────────────────────────────────────────────────────────┘
                                        │
                                        ▼
┌─────────────────────────────────────────────────────────────────────────┐
│    providing an inner ear audio signal to a second ear of a user, by the in-ear speaker, in  │
│                            response to the second input signal                                │
│                                      930                                                      │
└─────────────────────────────────────────────────────────────────────────┘
                                        │
                                        ▼
┌─────────────────────────────────────────────────────────────────────────┐
│  sensing, by an in-ear microphone that is proximate to the second ear of the user, a sensed  │
│   audio signal; wherein the sensed audio signal is affected by the inner ear audio signal and│
│  another signal that represents an interference audio signal that is heard by the second ear │
│                                       of the user                                             │
│                                         940                                                   │
└─────────────────────────────────────────────────────────────────────────┘
                                        │
                                        ▼
┌─────────────────────────────────────────────────────────────────────────┐
│    calculating a compensating signal that once provided to a bone conductor speaker will     │
│   cause the bone conductor speaker to output an output signal that reduces an audio effect   │
│                  of the interference audio signal on a first ear of the user                  │
│                                         950                                                   │
└─────────────────────────────────────────────────────────────────────────┘

┌─────────────────────────────────────────────────────────────────────────┐
│   closing the first ear of the user by an earplug as to improve a signal to noise in the first│
│                              ear due to an occlusion effect                                    │
│                                         980                                                    │
└─────────────────────────────────────────────────────────────────────────┘
```

EARPIECE AND A METHOD FOR PLAYING A STEREO AND A MONO SIGNAL

CROSS REFERENCE TO RELATED APPLICATIONS

This application claims the benefit of U.S. provisional application Ser. No. 61/112,785, filed on Nov. 10, 2008 (and entitled Stereo Method And System), which is incorporated in their entirety herein by reference.

BACKGROUND OF THE INVENTION

Today mobile phones and other portable devices provides high quality stereo music, users listen to music on the go. If the user uses wireless headset such as Bluetooth headset, he wears a relatively big headset as two speakers are attached to the pinna.

In mobile phone with standard earpiece the user hears the incoming voice call via one ear, the ear to which he attaches the phone or the headset. It is well known that when the user hears the voice call in both ears, he hears the call significantly better and the intelligibility and pleasantness of the call significantly increases. The importance of hearing the voice call in both ears increases when the user is surrounded by a high noise environment. In order to hear a voice call in both ears and still keep the privacy of the call, the user needs to use a headset with two earpieces that are attached to both ears. Using such a headset is inconvenient as it isolates the user from his surrounding, this can be very dangerous when people are talking and walking in public places. In addition, driving a car with a headset that uses two earpieces is very dangerous and in some countries it is forbidden by the law.

In mobile phone when the user uses one earpiece to listen to a voice call, he picks up the ambient noise in the uncovered ear. This can be very problematic in an environment with high ambient noise.

There is a need for providing a high quality audio by using one earpiece wherein the user hears voice call or music in both ears.

SUMMARY OF THE INVENTION

An earpiece for providing an audio signal to two ears of a user, includes: an audio interface for providing an audio signal that includes a first input signal and a second input signal; a bone conduction speaker coupled to the audio interface for outputting an output signal; wherein the outputting of the output signal causes an audio signal to reach a first ear of a user and causes a leakage signal to reach a second ear of the user; an adaptive filter with an adjustable impulse response for filtering the first input signal to provide a filtered signal that once played to the second ear of a user, by an in-ear speaker, reduces an audio effect of the leakage signal on the second ear of the user; an in-ear speaker coupled to the audio interface for providing an in-ear audio signal to the second ear of the user, in response to the filtered signal and the second input signal; an in-ear microphone for sensing a sensed audio signal; and a processor for updating an impulse response of the adaptive filter in order to reduce a contribution of the leakage signal to the sensed audio signal.

A method for providing an audio signal to two ears of a user by using a single earpiece, the method includes: receiving an input signal that includes a first input signal and a second input signal; injecting the first input signal to a bone conductor speaker; outputting an output signal by the bone conductor speaker in response to the first input signal; wherein the outputting of the output signal causes an audio signal to reach a first ear of the user and causes a leakage signal to reach a second ear of the user; filtering the first input signal by an adaptive filter to provide a filtered signal that once played to the second ear of a user by an in-ear speaker reduces an audio effect of the leakage signal on the second ear of the user; sending, to an in-ear speaker, the filtered signal and the second input signal; providing an in-ear audio signal to the second ear of the user, by the in-ear speaker, in response to the filtered signal and the second input signal; sensing, by an in-ear microphone, a sensed audio signal; and updating an impulse response of the adaptive filter in order to reduce a contribution of the leakage signal to the sensed audio signal.

A method for providing a audio signal to two ears of a user by using a single earpiece, the method includes: receiving a first input signal; sending the first input signal to an in-ear speaker; providing an inner ear audio signal to a second ear of a user, by the in-ear speaker, in response to the second input signal; sensing, by an in-ear microphone that is proximate to the second ear of the user, a sensed audio signal; wherein the sensed audio signal is affected by the inner ear audio signal and by another signal that represents a second audio signal that is heard by the second ear of the user; and calculating a compensating signal that once provided to a bone conductor speaker will cause the bone conductor speaker to output an output signal that reduces an audio effect of the second audio signal on a first ear of the user.

An earpiece that includes: an audio interface for receiving an input signal;

an in-ear speaker for providing an inner ear audio signal to a second ear of a user, by the in-ear speaker, in response to the input signal; an in-ear microphone that is proximate to the second ear of the user, for sensing a sensed audio signal; wherein the sensed audio signal is affected by the inner ear audio signal and another signal that represents a second audio signal that is heard by the second ear of the user; and a processor for calculating a compensating signal that once provided to a bone conductor speaker will cause the bone conductor speaker to output an output signal that reduces an audio effect of the second audio signal on a first ear of the user.

A phone providing an audio signal to two ears of a user, includes: a bone conduction speaker for outputting an audio signal; wherein the outputting of the output signal causes a leakage signal to reach a second ear of a user; an adaptive filter with an adjustable impulse response for filtering the first input to provide a filtered signal that once played to the second ear of a user by an in-ear speaker reduces an audio effect of the leakage signal on the second ear of the user; an in-ear speaker coupled to the audio interface for providing an in-ear audio signal to the second ear of the user, in response to the filtered signal and the second input signal; an in-ear microphone for sensing a sensed audio signal; and a processor for updating an impulse response of the adaptive filter in order to reduce a contribution of the leakage signal to the sensed audio signal.

A headset with two earpieces that includes: an audio interface for providing an audio signal that includes a first input signal and a second input signal; a first in-ear speaker for providing a first inner ear audio signal to a first ear of a user, in response to the first input signal and a second in-ear speaker for providing a second inner ear audio signal to a second ear of a user, in response to the second input signal; at least one in-ear microphone that is proximate to the first ear of the user, for sensing a sensed audio signal; wherein the sensed audio signal is affected by the first inner ear audio signal and another signal that represents a second audio signal that is heard by the first ear of the user; and a processor for calculating a compensating signal that once provided to the in-ear speakers will cause the in-ear speakers to output an output signal that reduces an audio effect of the second audio signal.

An earpiece for providing an audio signal to two ears of a user, includes:

an audio interface for providing an audio signal that includes a first input signal and a second input signal; a bone conduction speaker coupled to the audio interface for outputting an output signal; wherein the outputting of the output signal causes an audio signal to reach a first ear of a user and causes a leakage signal to reach a second ear of the user; an adaptive filter with an adjustable impulse response for filtering the first input signal to provide a filtered signal that once played to the second ear of a user, by an in-ear speaker, reduces an audio effect of the leakage signal on the second ear of the user; and a processor for updating an impulse response of the adaptive filter in order to reduce a contribution of the leakage signal to the sensed audio signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 illustrates a method according to an embodiment of the invention;

FIG. 9 illustrates a method according to another embodiment of the invention.

Figure 1:
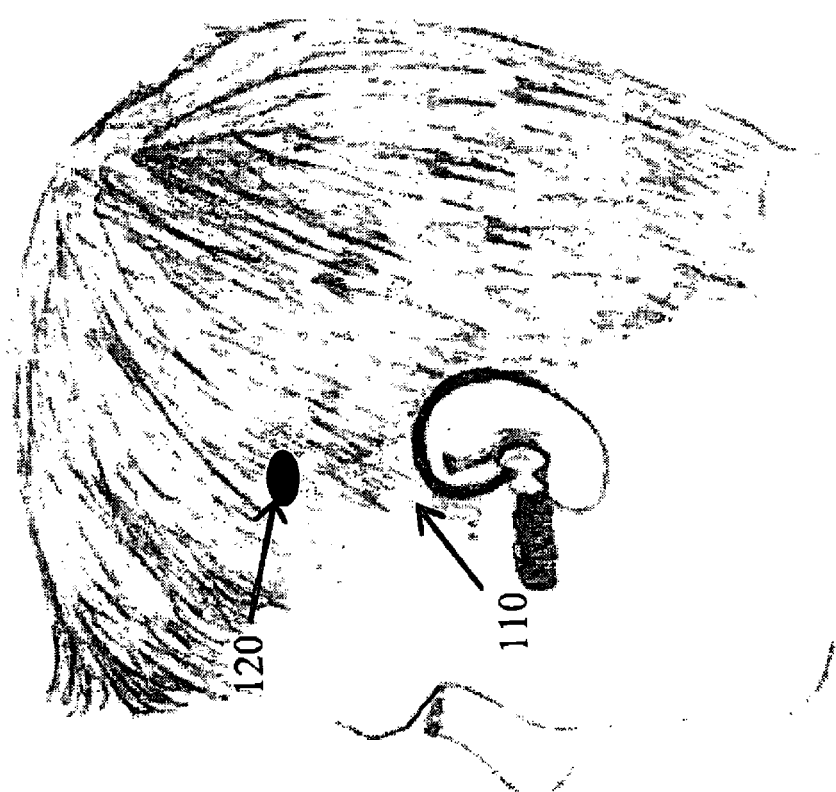
FIG. 1 presents a typical headset with one earpiece that provides stereo audio or a mono voice call to both ears according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A headset with one earpiece is provided, the headset is capable of providing sound that can be heard by both ears (without sound being audible to parties not wearing the headset).

The headset contains at least a bone conduction speaker, a microphone, a digital signal processor, and at least one speaker. The ear on which the earpiece is positioned hears sound provided by the headset, while the second ear remains uncovered. To provide sound to the uncovered ear, the bone conduction speaker is used. The DSP processes the sound signal in such a way that the sound travels through bone of the user and is heard at the uncovered ear as if an earpiece was placed over that ear as well.

The uncovered ear is opened to capture the ambient noise. To reduce, or cancel the noise, few different techniques may be used. A first technique is amplifying the signal that is transmitted by the bone conduction speaker so that this signal is stronger than the signal that is played via the speaker to the covered ear. By doing this, the signal that is heard by the uncovered ear is actually louder, however, the noise causes this sound seem equal to the signal played to the covered ear. A second technique includes using the microphone on the headset so as to analyze noise. A noise reduction signal is then produced, so that when the noise reduction signal is combined with the audio signal transmitted to the uncovered ear by the bone conduction speaker, the uncovered ear hears the sounds produced by the headset with minimal noise interference.

In the following description the term "covered ear" refers to a user ear on which an earpiece is placed. The covered ear is also referred to as "a second ear". The term "uncovered ear", means: the ear that does not hold an earpiece and is also referred to as "a first ear".

FIG. 1 presents a typical headset with one earpiece that provides stereo audio or mono voice call to both ears, the uncovered ear as well as the covered ear (i.e. the ear with the earpiece). The earpiece can also be used for reducing the noise effect on the uncovered ear, which is more sensitive to ambient noise than the covered ear.

The earpiece includes a bone conduction speaker 120 that can be placed in various locations, closed to a bone, such as the Zygomatic bone or the Temporal bone, by using an attachment device, such as a headset ring, that is placed behind the ear and is used for receiving a signal that is delivered to the earpiece. Bone conduction speaker 120 produces vibrations and is used for conducting the signal to the other (uncovered) ear by using the bone as a conducting media.

The earpiece also has an in-ear part 110 that includes an in-ear speaker that delivers an audio to the covered ear and an in-ear microphone that is used for picking up the in-ear signal, i.e. the audio that is heard by the user. It should be noted that in-ear part 110 can be attached to the pinna instead of being placed inside the ear, although, for simplicity, it will be referred to it as an in-ear part (in-ear speaker and in-ear microphone). The picked up in-ear signal is used for calculation of undesired audio, by subtracting the desired signal from the picked up in-ear signal. The undesired audio can be: an ambient noise, a leakage signal which is a side effect of the bone conducting or a combination of both ambient noise and the leakage signal.

The headset can also include a standard or in-ear microphone (not shown) to pick up the voice of the user during the voice call.

The earpiece can be used for different modes of operation such as: (i) Delivering a stereo signal to both the covered ear and the uncovered ear; (ii) Delivering mono voice calls to both ears simulating the effect of using a headset with two earpieces wherein each earpiece attached to one ear; (iii) Hearing voice calls with a special earpiece that reduces the ambient noise effect in the covered and uncovered ear; and (iv) Delivering stereo or mono signal like in (i) or (ii), and in addition reducing the ambient noise like in (iii).

Figure 2:
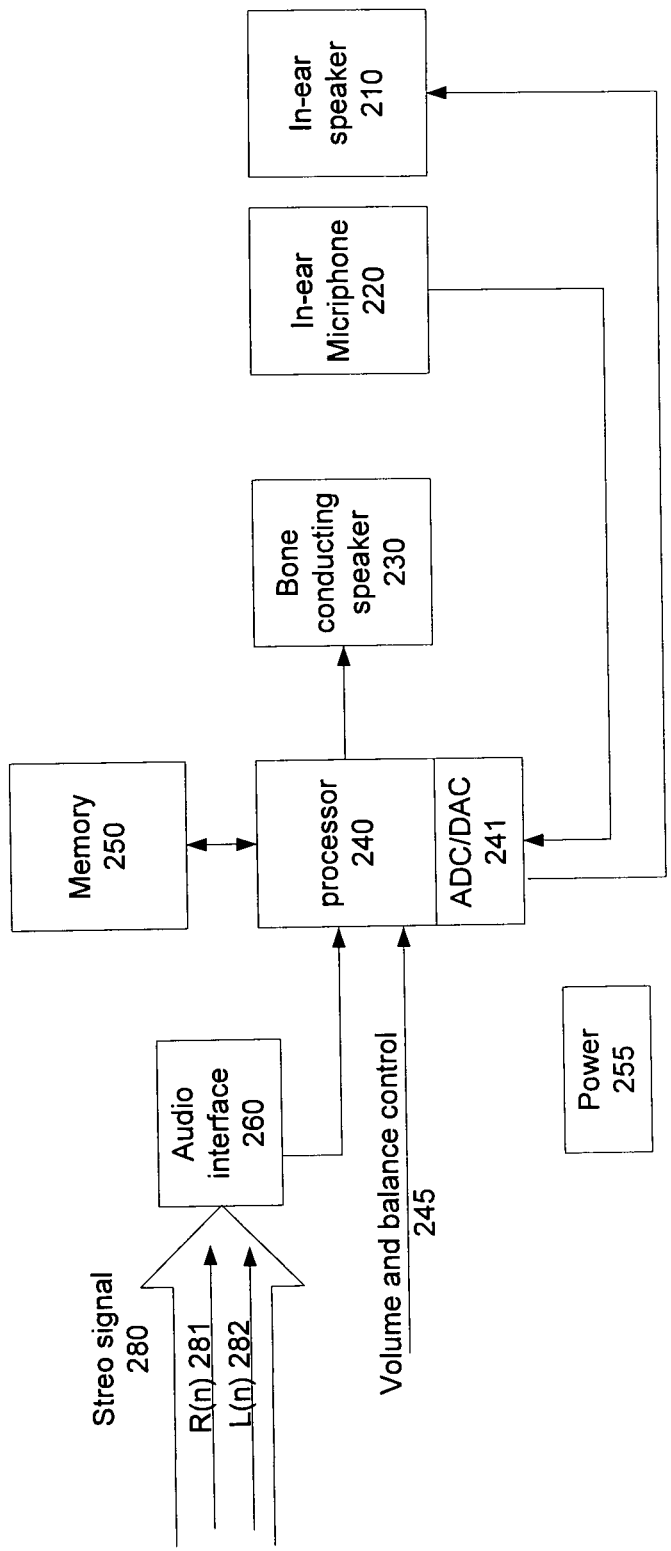
FIG. 2 illustrates an earpiece according to an embodiment of the invention.

FIG. 2 illustrates an earpiece 200 that a user wears on one ear. Earpiece 200 delivers stereo music or a mono voice call to both ears (even though it covers only one ear) and may provide a noise reduction effect to the uncovered ear.

Earpiece 200 includes: (i) an in-ear speaker 210; (ii) an in-ear microphone 220 for sensing the signal that is in the ear canal; (iii) a bone conduction speaker 230 for conducting of audio to the uncovered ear through the bone. bone conduction speaker 230 is placed closed to the bone of the user on the same side of the user's face where in-ear speaker 210 is located; (iv) a processor 240 for receiving: two audio signals in case of a stereo mode and one audio signal in case of a mono mode (namely R(n)=L(n)); a signal that was picked up from the ear canal by in-ear microphone 220; and a signal from an audio interface 260. Processor 240 further processes the received signals. Processor 240 can be a Digital Signal Processing (DSP), an ARM processor or any other processor; Audio interface 260 is an interface between an audio device (not shown, e.g. an audio player or a cellular phone) and earpiece 200. Audio interface 260 can include a splitter for splitting a mono signal into two equal signals. Audio interface 260 can communicate with the audio device by using a wireless technique (e.g. Bluetooth, Wi-Fi) or a wired connection. In the former case audio interface 260 includes a wireless receiver and in the latter case audio interface 260 includes an analog interface or a digital interface, in case of analog interface 260 will include ADC (Analogue to Digital Convertor) to convert the analog signal into digital signal; Power source 255 for supplying power for earpiece 200; An ADC and DAC (Digital to Analogue Convertor) units 241 are coupled to processor 240 and converts an analog signal to a digital signal and a digital signal to an analog signal, respectively; and a memory 250 to be used by processor 240 for intermediate storing of calculation data. The earpiece can also include a standard microphone or an in-ear microphone for picking up the voice of the user during a voice call.

A stereo signal 280 is transmitted from the audio device and received by audio interface 260. Stereo signal 280 includes two signals: a left signal, denoted L(n) 282 that is excepted to be heard by the left ear of the user and a right signal, denoted R(n) 281 that is expected to be heard by the right ear. Assuming that earpiece 200 is attached to the right ear of the user, in this configuration, in-ear speaker 210 will deliver the right signal R(n) 281 and bone conduction speaker 230 that is also attached to the right ear will deliver left signal L(n) 282. L(n) 282 signal propagates through the bone to the left ear with an attenuation $\alpha$. L(n) 282 propagates to the right ear as well, but with a different attenuation $\beta$. It should be noted that $\alpha$ and $\beta$ may be frequency dependent, however for the sake of simplicity, we refer to $\alpha$ and $\beta$ as frequency independent. The modification to frequency dependent is straight forward and can be understood by a person skilled in the art.

Conveniently, the signal that is fed to the bone conduction is equalized in order to improve the signal, however for simplicity of the explanation, we assume that no equalization is done. The modification with equalizer is straight forward and can be understood by those skilled in the art.

Thus, supposed only L(n) 282 is applied, the left and right ear will hear:

$$\text{Left-ear}(n) = \alpha L(n) \text{ and Right-ear}(n) = \beta L(n). \quad \text{(i)}$$

Adding the contribution of in-ear speaker 210 that delivers R(n) 281 results:

$$\text{Left-ear}(n) = \alpha L(n) \text{ and Right-ear}(n) = \beta L(n) + R(n). \quad \text{(ii)}$$

The target is to process these pair of signals such that the user will hear the original right signal, R(n) 281, in his right ear and the original left signal, L(n) 282, in his left ear as in a standard stereo headset. Thus, the targeted Left-ear(n) and Right-ear(n) should be: Left-ear(n)=L(n) and Right-ear(n)=R(n).

It worthwhile to mention that a similar process will be conducted, if earpiece 200 is placed on the left ear with the appropriate modifications applied to the left and right signals.

Processor 240 receives the input signals: L(n) 282 and R(n) 281 from audio interface 260. A Volume and balance control 245 is also provided to processor 240. Volume and balance control 245 is controlled by the user that operates the audio device and is delivered to earpiece 200 through a wired channel or a wireless channel.

Figure 3:
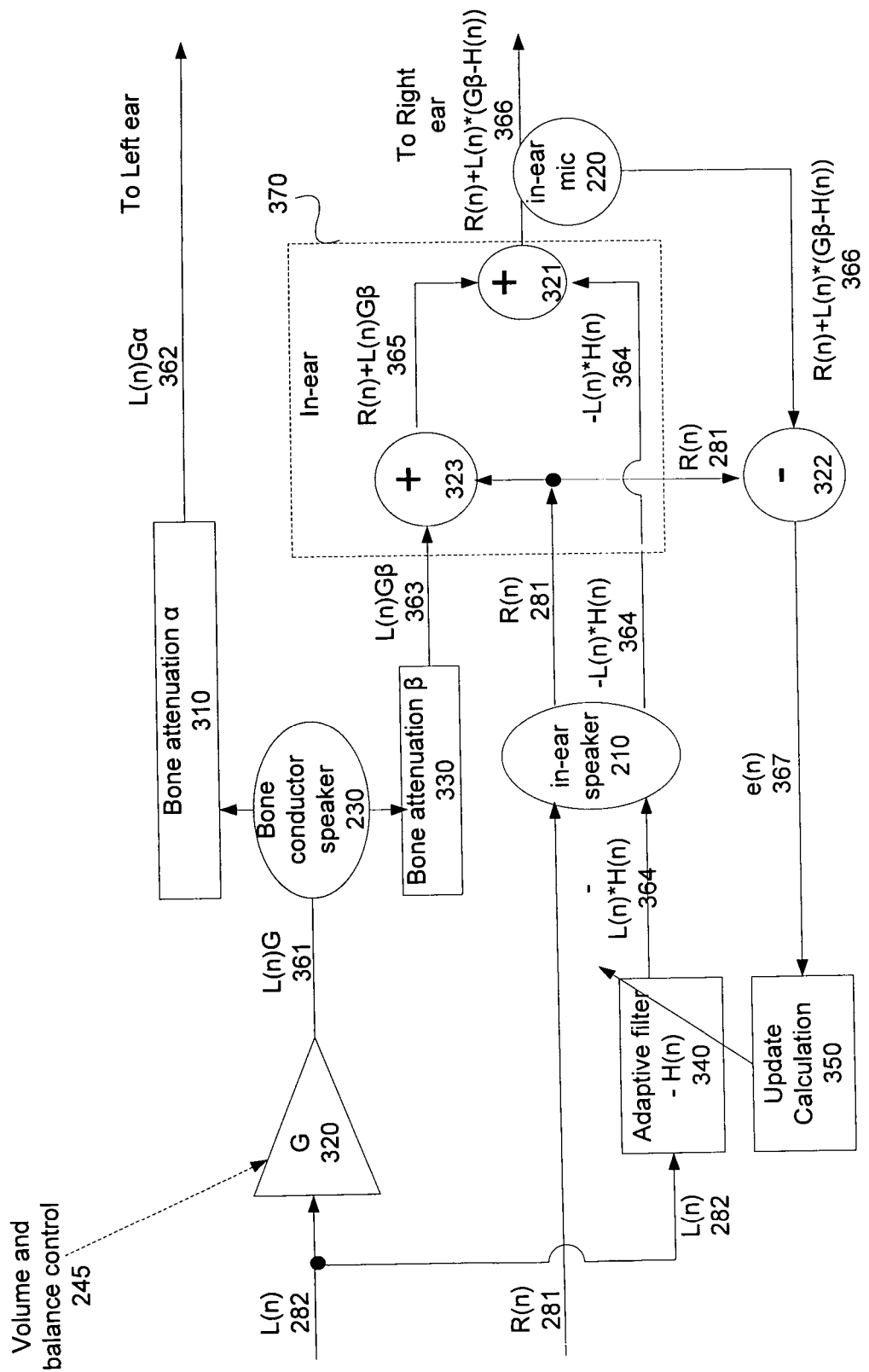
FIG. 3 illustrates a process diagram of a typical process implemented by a processor, according to an embodiment of the invention.

Processor 240 performs all the necessary processing to meet the target of Left-ear(n)=L(n) and Right-ear(n)=R(n), as described for FIG. 3.

FIG. 3 illustrates a process diagram of a typical process implemented by processor 240 as to achieve the above mentioned target of providing L(n) 282 and R(n) 281 to the left and right ear, respectively.

An amplifier 320 is controlled by the user via volume and balance control 245. Amplifier 320 is fed with Left signal L(n) 282. The user chooses a gain G for left signal L(n) 282 in order to balance between the left and right signals that he hears. The amplifying results an amplified signal 361 of a magnitude L(n)G. Amplified signal 361 is fed to bone conduction speaker 230 that is on the right side of the skull and amplified signal 361 propagates to the left side of the skull via the bone. During the propagation the signal is attenuated by $\alpha$, this effect is represented by block 310. Thus the user will hear in his left ear an attenuated signal 362 of a magnitude: L(n)G$\alpha$.

In his right ear the user is supposed to hear R(n) 281. Assuming that R(n) and L(n) should be balanced, it is expected that the user will choose a gain G such that G$\alpha \approx 1$, hence, the signal heard in the left ear:

$$\text{Left-ear}(n) = L(n)G\alpha \approx L(n). \quad \text{(iii)}$$

Left signal L(n) 282 also propagates via the bone to the right ear. In this route, left signal L(n) 282 is attenuated by a magnitude of $\beta$, as represented by block 330. Since it was assumed that bone conduction speaker 230 is attached to the right ear of the user, the distance between bone conduction speaker 230 and the right ear is shorter than the distance between bone conduction speaker 230 and the left ear. Hence the attenuation $\beta$, which is the attenuation applied to the signal during to its propagation to the right ear, is different than the attenuation $\alpha$, that is applied to the signal during to its propagation to the left ear. The portion of left signal L(n) 282 that will arrive the right ear is: L(n)G$\beta$.

Right signal R(n) is injected by in-ear speaker 210 to the right ear, hence the total signal that is heard by the right ear is:

$$R(n) + L(n)G\beta. \quad \text{(iv)}$$

This addition of signals, that is taking place in the ear canal, is demonstrated by an addition symbol 323. Note that dashed block 370 demonstrates phenomena that take place in the ear canal and not processes that are being handled by processor 240.

In order that the user will hear in his right ear only the right signal R(n), processor 240 performs the following process.

Left signal L(n) 282 is fed to an adaptive filter 340 with an impulse response H(n). Impulse response H(n) is updated by a process update calculation 350, as described later on. Adaptive filter 340 results a signal −L(n)*H(n) 364 that is injected to in-ear speaker 210. Signal 364 of −L(n)*H(n) is added in the ear to signal 365 of R(n)+L(n)Gβ as presented by an addition symbol 321. The output of this addition is denoted as $\hat{R}(n)$ where:

$$\hat{R}(n)=R(n)+L(n)*(G\beta-H(n)) \qquad (v)$$

Equation (v) represents a right output signal 366 that is heard by the user in the right ear. Right output signal 366 is picked up by in-ear microphone 220 and the signal is also denoted as in-ear-mic(n).

To achieve the target of $\hat{R}(n)=R(n)$ we calculate at an error calculator 322 an error e(n) where:

$$e(n)=\text{in\_ear\_mic}(n)-R(n). \qquad (vi)$$

Error calculator 322 feeds update calculation 350 with error e(n) 367. Error calculation 350 can use LMS (Least mean square) algorithm or any other algorithm to find coefficients of the filter response H(n) of adaptive filter 340, that minimizes e(n). Once the minimum of e(n) is achieved, the right ear will hear: $\hat{R}(n) \approx R(n)$ In the case of mono voice call, the same process is done where R(n)=L(n). In this case, if the minimum of e(n) is not small enough, the user still hear a mono signal in both ears which will give him the desired impression.

According to some embodiments of the invention, earpiece 200 can reduce the ambient noise in the uncovered ear. This is important especially when earpiece 200 is used for receiving voice call, in which case the ambient noise can significantly affect the intelligibility of the speech. The following embodiments are provided for the ambient noise reduction.

When earpiece 200 is placed on the right ear, the ambient noise penetrating the right ear does not significantly block the voice, as the user can increase the volume of the voice call as to mask the ambient noise in the covered ear. However the ambient noise that is penetrating the uncovered ear cannot be masked by increasing the volume in the covered ear.

Earpiece 200 can reduce the ambient noise effect significantly as follows: The voice of the call is injected to in-ear speaker 210 and to the bone conduction speaker 230. The voice that is injected to the bone will be heard on the left side as was described for FIGS. 2 and 3. The volume of the bone conducted signal can be controlled by the user via volume and balance control 245 as described in FIG. 3. With the appropriate volume setting, the effect of the ambient noise in the uncovered ear will be reduced and the phone conversation experience will be improved. This is due to the fact that without sound injection to the uncovered ear, the user hears in this ear pure ambient noise. By injected voice signal to the uncovered ear the user hear in his uncovered ear the voice signal plus ambient noise, if the voice that is injected via the bone is high enough compared to the ambient noise, the brain will mask part of the ambient noise and the call intelligibility will increase.

According to another embodiment of the invention, a blocking or reduction of the ambient noise in the uncovered ear is done by a noise subtraction mechanism. The following description refers to an example in which earpiece 200 is attached to the right ear of the user and the left ear is uncovered.

The voice of an incoming call is injected to in-ear speaker 210 and a noise reduction signal is injected to bone conduction speaker 230. The canceling signal reflects an estimated ambient noise with an appropriate phase change applied to it. The ambient noise will enter the left ear and will be partially eliminated by the noise reduction signal that also enters the uncover ear through the bone, such that the total noise that is heard in the left ear is reduced.

The ambient noise can be estimated by adding an external microphone for picking up the ambient noise, or alternatively, by using in-ear microphone 220, with some additional processing.

Figure 5:
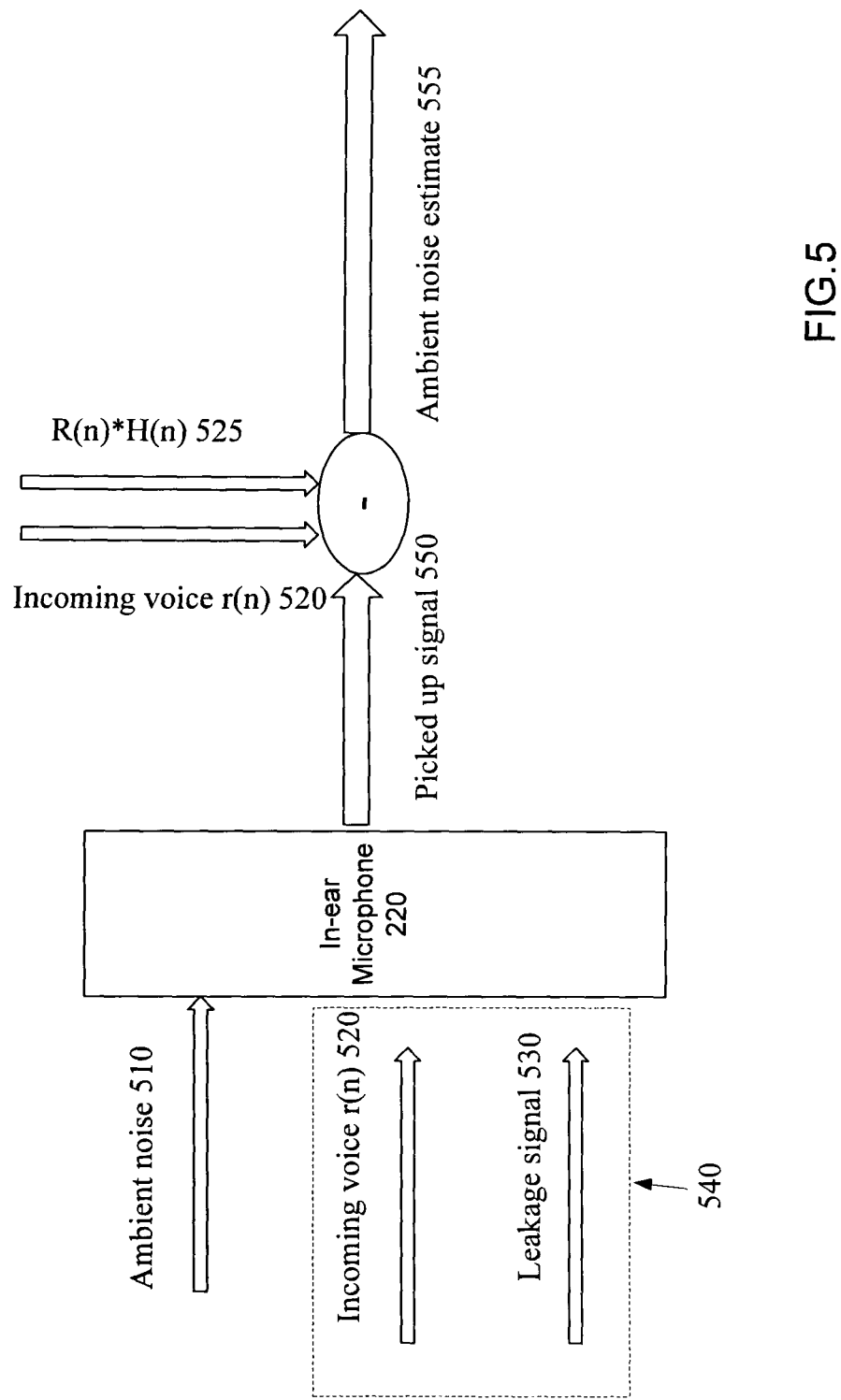
FIG. 5 illustrates ambient noise estimation using in-ear microphone according to an embodiment of the invention.

FIG. 5 illustrates in-ear microphone 220 that actually picks up the signal that the user hears. A picked up signal 550 is composed of known signals and the ambient noise. Known signal 540 includes an incoming voice 520, conveniently a mono signal (in which case L(n)=R(n)), that is transmitted from an audio device to earpiece 200 and injected via in-ear speaker 210 and a leakage signal 530 from bone conduction speaker 230 denoted as R(n)Gβ. However once a minimum is achieved per equation (v) and equation (vi), Gβ~H(n) and the leakage signal is R(n)*H(n) which is known. H(n) is the impulse response of adaptive filter 340. Subtracting the incoming voice 520 and signal 525 (which substantially equals leakage signal 530) from picked up signal 550, results subtracted signal 555 which is the estimated ambient noise.

Figure 4:
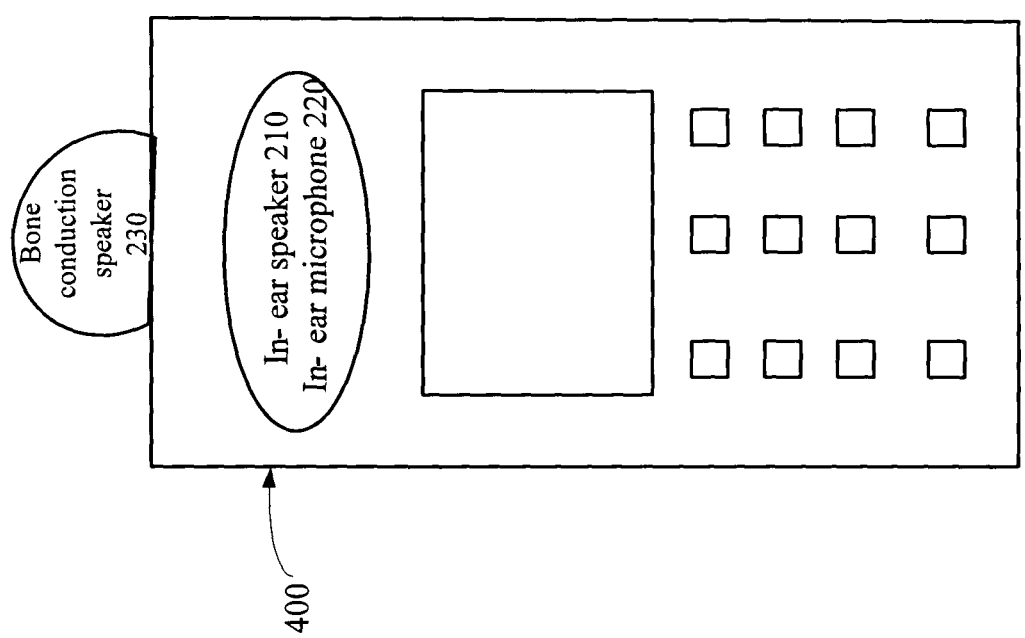
FIG. 4 illustrates a mobile phone according to an embodiment of the invention.

Earpiece 200 can be embedded in a mobile phone 400, as illustrated in FIG. 4. When embedded in a mobile phone, bone conduction speaker 230 is located such that during normal phone call it will touch the bone. In-ear microphone 220 and in-ear speaker 210 are located as illustrated in FIG. 4. Mobile phone 400 may include a standard microphone or an in-ear microphone (not shown) to pick up the voice of the user during the voice call.

There are many headsets that are designed to cancel ambient noise, most of them cover the pinna and estimate the ambient noise by using external microphone. According to an embodiment of the invention, in-ear microphone 220 does not measure the ambient noise, but rather the signal in the ear canal which is the actual signal the user hear.

Figure 6:
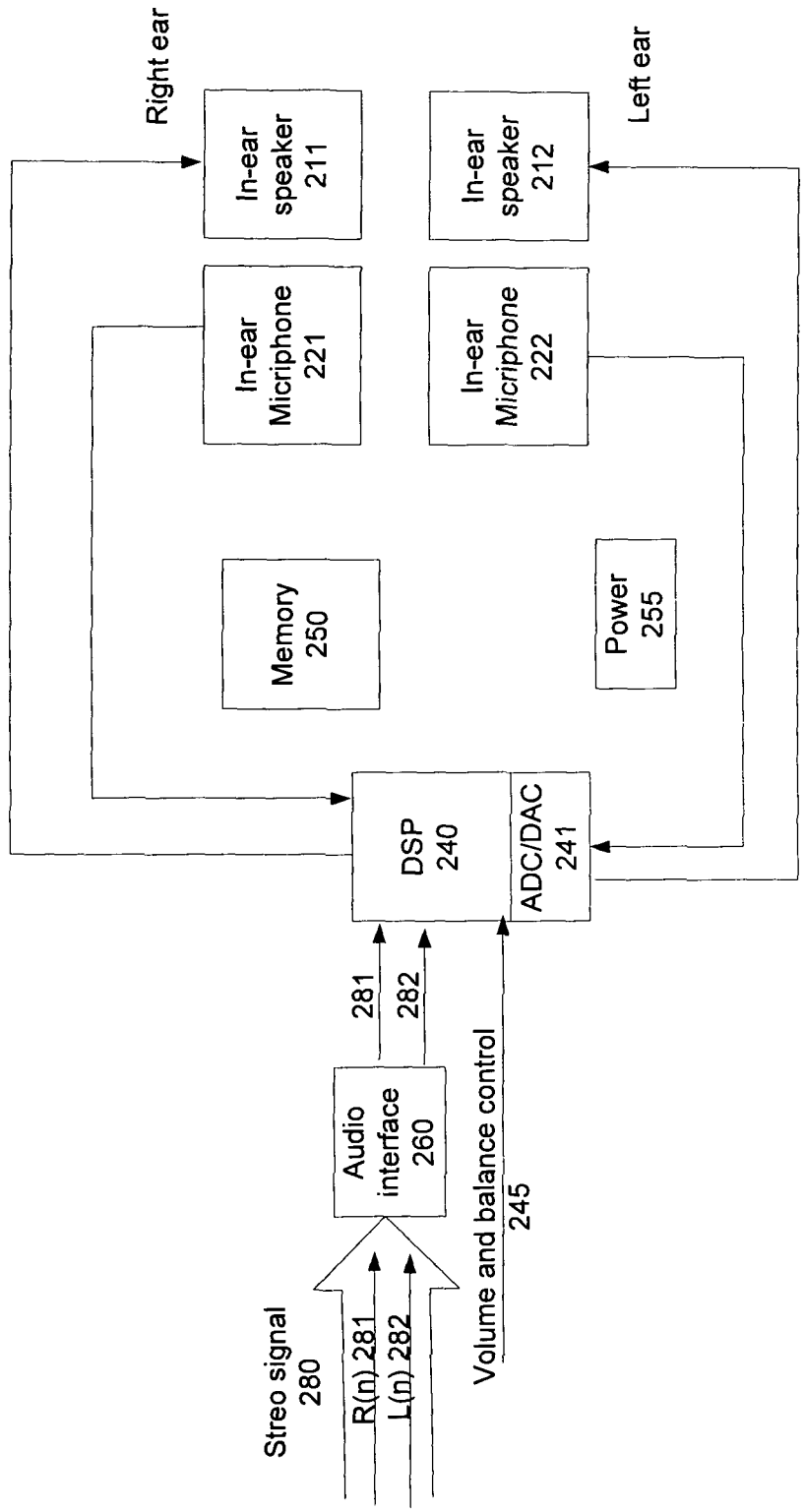
FIG. 6 illustrates a noise reduction headset with a noise reduction or a noise cancellation mechanism according to an embodiment of the invention.

FIG. 6 illustrates a noise reduction headset 600 with a noise reduction or a noise cancellation mechanism. Headset 600 uses a combination of in-ear speaker with in-ear microphone, in each ear, that picks the signal that is in the ear canal for both the left and right ears. Headset 600 enables canceling the ambient noise without the need for an external microphone. Headset 600 includes: two in-ear speaker 211 and 212, two in-ear microphones 221 and 222. Both in-ear microphones 221 and 222 pick up the signal that is in the left and right ear canal, respectively; processor 240 that receives signals from both in-ear microphones 221 and 222. Processor 240 performs a signal processing using memory 250; audio interface 260 receives an audio signal from a music device. Headset 600 can be wirelessly connected to the music device, in which case, audio interface 260 includes a wireless receiver. Headset 600 can be wired connected to the music device, in which case it includes an analog interface, with an ADC or a digital interface if the connection is a digital connection. The output of audio interface 260 is fed to processor 240; and power source 255 that supply the power of headset 600.

Processor 240 can be a DSP, ARM or any other processor. Processor 240 is attached to ADC and DAC units 241 that converts analog signal to digital or digital signal to analog signal. The input of processor 240 are left and right signals L(n) 282 and R(n) 281 supplied by audio interface 260. In addition volume and a balance control 245 is provided to processor 240.

Although FIG. 6 illustrates two microphones, it is possible to use only one in-ear microphone (assuming a similar ambient noise is penetrating both ears). It should be noted that a similar process can be applied with one earpiece which will cancel the noise penetrating the earpiece. A similar process can be applied by using bone conduction speakers.

Processor 240 estimates the ambient noise and cancels it or part of it, from both ears.

The right in-ear microphone 221 picks up the sum of right signal R(n) 281 and the noise in the right ear canal N_canal_right(n). The left in-ear microphone 222 picks up the sum of left signal L(n) 282 and the noise in the left ear canal N_canal_left(n). The aim of processor 240 is to process the received in-ear microphone signals so that the user will hear the original left signal L(n) 282 on his left ear and the original right signal R(n) 281 on the right ear.

Figure 7:
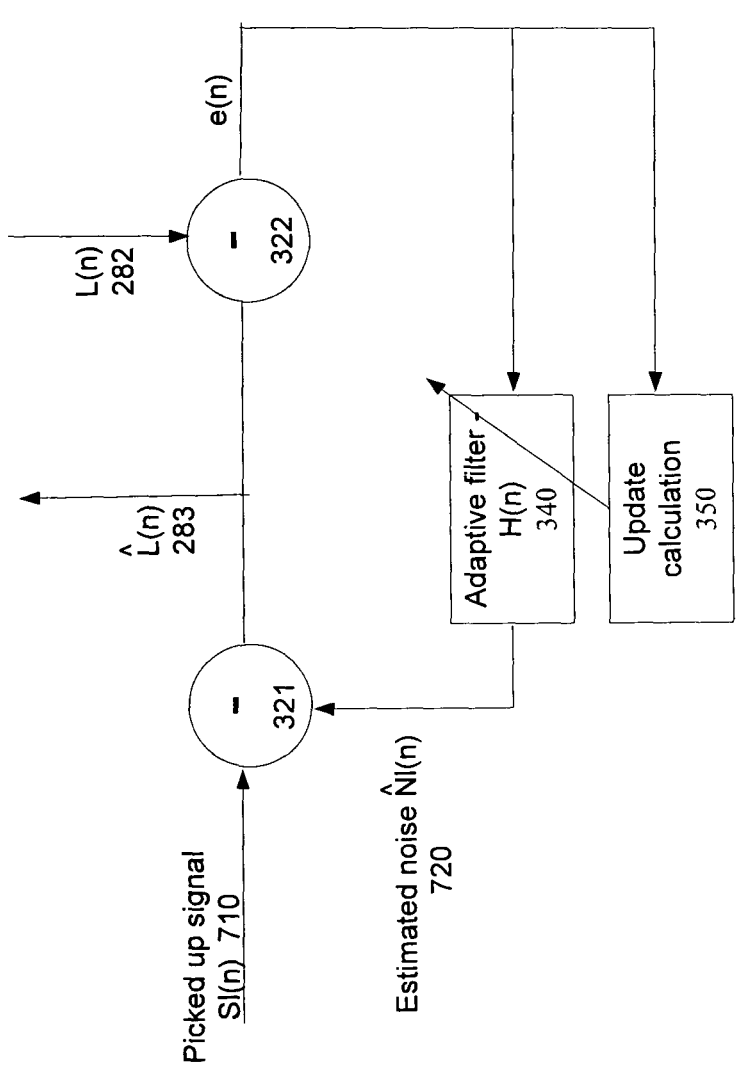
FIG. 7 illustrates a process of noise estimation and subtraction according to an embodiment of the invention.

FIG. 7 illustrates a process of noise estimation and subtraction. The process is demonstrated for the left ear but the same process applies to the right ear. Left signal L(n) 282 is the desired signal. The Left in-ear microphone 222 picks up the signal: $Sl(n)=L(n)+Nl(n)$
wherein Sl(n) is a picked up signal 710 and Nl(n) is the noise that is picked up by the left ear. FIG. 7 illustrates an example of how to estimate the noise in the left ear, wherein an estimated noise 720 is denoted by $\hat{N}l(n)$ and hence estimated left signal 283 is $\hat{L}(n)=Sl(n)-\hat{N}l(n)$. An adaptation process can use different algorithms, a typical process is to use LMS technique. The output of the adaptation calculation change the impulse response H(n) of adaptive filter 340.

The ambient noise is estimated and at least partially subtracted from the left picked up signal 710. The user can decide not to cancel all the ambient noise but only a portion thereof, namely $\hat{L}(n)=Sl(n)-\delta\hat{N}l(n)$ where $\delta$ is chosen by the user.

Conveniently, processor 240 can analyzed the type of the ambient noise and detect some predefined signal types such as ambulance/police siren, horn from a car or some other predefined signals. Once a predefined signal type is detected, processor 240 will automatically reduce the volume of the music sound in order that the user will be able to hear the external sound. Alternatively, processor 240 will signal the user by a synthesized sound or in any other way that the predefined signal type was detected.

FIG. 8 illustrates a method 800 for providing an audio signal to both ears of a user, using a single earpiece. The earpiece is placed on one ear, that will be referred to as the covered ear while the second ear will be referred to as the uncovered ear.

Method 800 begins with a stage 810 of receiving an audio signal. The audio signal can be a stereo signal or a mono voice call. The audio signal includes a first input signal that is intended to be heard by an uncovered ear of a user and a second signal that is intended to be heard by a covered ear of the user. If the audio signal is a mono signal, stage 810 further includes splitting the audio signal, such that the first input signal is equal to the second input signal.

Stage 810 is followed by stages 820, and 850 that are simultaneously executed.

Stage 820 includes amplifying the first input signal by a gain factor G, for producing an amplified signal. The gain factor G is set by the user and stage 820 can include receiving, from the user device, a volume and balance control indicating the gain factor. Controlling the gain can partially masks the ambient noise in the uncovered ear.

Stage 820 is followed by stage 840 of injecting the amplified signal to a bone conduction speaker and outputting an output signal by the bone conducting speaker in response to the first input signal.

The output signal propagates through the bone and arrives to the covered ear with an attenuation $\beta$. Thus, when the first input signal arrives to the covered ear it is multiplied by a propagation factor $G\beta$. This signal is referred to as a leakage signal.

Stage 850 includes filtering the first input signal by an adaptive filter to provide a filtered signal that once played to the second ear of a user by an in-ear speaker reduces an audio effect of the leakage signal on the second ear of the user.

Stages 840 and 850 are followed 870 of sending, to an in-ear speaker, the filtered signal and the second input signal providing an in-ear audio signal to the second ear of the user, by the in-ear speaker, in response to the filtered signal and the second input signal.

Stage 870 is followed by stage 880 of sensing, by an in-ear microphone, a sensed audio signal. The sensed audio signal is responsive to the second input signal, the leakage signal and the filtered signal.

Stage 880 is followed by stage 890 of updating an impulse response of the adaptive filter in order to reduce a contribution of the leakage signal to the sensed audio signal. Stage 890 is followed by stage 850.

FIG. 9 illustrates a method 900 for reducing a noise from an audio that is provided by an earpiece.

Stage 900 starts with a stage 910 of receiving an input signal. The input signal can be a mono or a stereo signal. If the input signal is a stereo signal then the input signal includes a first input signal that is different than the second input signal and if the input signal is a mono signal then the input signal includes a first input signal that is the same as the second input signal.

Stage 910 is followed by stage 920 of sending the first input signal to a first ear by a bone conduction speaker.

Stage 920 is followed by stage 930 of providing an in-ear audio signal to a second ear of a user, by the in-ear speaker, in response to the second input signal.

Stage 930 is followed by stage 940 of sensing, by an in-ear microphone that is proximate to the second ear of the user, a sensed audio signal; wherein the sensed audio signal is affected by the in-ear audio signal and another signal that represents an interference audio signal that is heard by the second ear of the user. The interference audio signal can be an ambient noise.

Stage 940 is followed by stage 950 of calculating a compensating signal that once provided to a bone conductor speaker will cause the bone conductor speaker to output an output signal that reduces an audio effect of the interference audio signal on a first ear of the user. The interference audio signal is an undesired signal such as an ambient noise. This stage can either eliminate or reduce the ambient noise. The compensating signal can be provided by using adaptive filter 340 of FIGS. 3 and 7.

Method 900 can include stage 980 of closing the first ear of the user by an earplug or even a finger as to improve a signal to noise in the first ear due to an occlusion effect. Since the audio is provided to the first ear through the bone, closing the ear does not interfere the providing of the input audio, but rather reduces the ambient noise effect.

Figure 10:
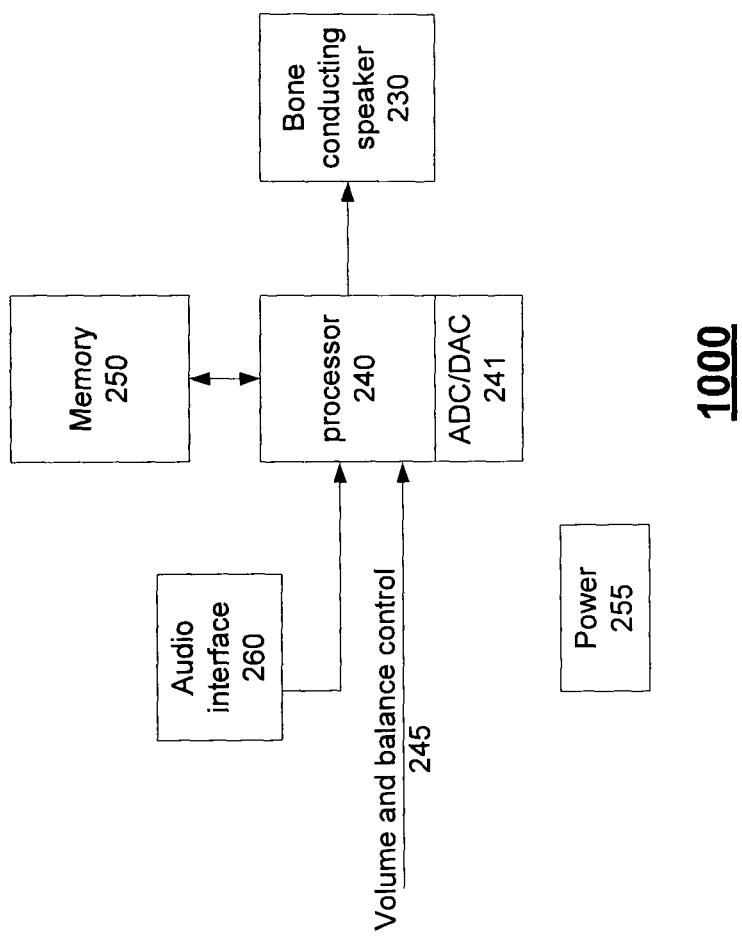
FIG. 10 illustrates an earpiece according to another embodiment of the invention.

FIG. 10 illustrates a simplified version of earpiece 200 for providing a mono audio signal to both ears of a user. An earpiece 1000 includes: (i) a bone conduction speaker 230 for conducting of audio to both ears through the bone. bone conduction speaker 230 is placed closed to the bone of the user; (ii) a processor 240 for receiving an input signal from an audio interface 260 and for further processing the received input signal, e.g. amplifying the signal; (iii) audio interface 260—as was described in FIG. 2; (iv) An ADC and DAC (Digital to Analogue Convertor)—as was described in FIG. 2; (v) a memory 250 to be used by processor 240 for intermediate storing of calculation data; and (vi) power supply 255.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for providing an audio signal to first and second ears of a user by using a single earpiece, the method comprising:
   receiving an input signal that comprises a first input signal and a second input signal; wherein the first input signal the second input signal are desired signals and do not include ambient noise;
   injecting the first input signal to a bone conductor speaker of the single earpiece, wherein the single earpiece is positioned on the second ear of the user;
   outputting an output signal by the bone conductor speaker in response to the first input signal; wherein the outputting of the output signal causes an audio signal to reach the first ear of the user and causes a leakage signal to reach the second ear of the user;
   filtering the first input signal by an adaptive filter to provide a filtered signal that once played to the second ear of the user by an in-ear speaker of the single earpiece reduces an audio effect of the leakage signal on the second ear of the user;
   sending, to an in-ear speaker of the single earpiece, the filtered signal and the second input signal;
   providing an in-ear audio signal to the second ear of the user, by the in-ear speaker, in response to the filtered signal and the second input signal;
   sensing, by an in-ear microphone of the single earpiece, a sensed audio signal; and
   updating an impulse response of the adaptive filter in order to reduce a contribution of the leakage signal to the sensed audio signal.

2. The method of claim 1, wherein the sensed audio signal further comprises an ambient noise and wherein the updating of the impulse response further comprises reducing the contribution of the ambient noise.

3. The method of claim 1, further comprises amplifying, the first input signal, by a gain factor, so as to compensate an attenuation applied to the first input signal while propagating through a bone, to the first ear of the user.

4. The method of claim 3, further comprises receiving, from a user device a volume and balance control indicating the gain factor.

5. The method of claim 1, wherein the updating of the impulse response comprises calculating an error by subtracting the second input signal from the picked up in-ear signal.

6. The method of claim 5, wherein the updating of the impulse response comprises calculating coefficients of a required impulse response, based on the error, so as to minimize the error.

7. The method of claim 6, wherein the calculating of the coefficients comprises using a least mean square algorithm.

8. The method of claim 1 wherein the first input signal differs from the second input signal.

9. The method of claim 1 wherein the first input signal equals to the second input signal.

10. An earpiece for providing an audio signal to first and second ears of a user, comprising:
    an audio interface for providing an audio signal that comprises a first input signal and a second input signal; wherein the first input signal the second input signal are desired signals and do not include ambient noise; wherein the single earpiece is positioned on the second ear of the user;
    a bone conduction speaker coupled to the audio interface for outputting an output signal; wherein the outputting of the output signal causes an audio signal to reach the first ear of the user and causes a leakage signal to reach the second ear of the user;
    an adaptive filter with an adjustable impulse response for filtering the first input signal to provide a filtered signal that once played to the second ear of a user, by an in-ear speaker, reduces an audio effect of the leakage signal on the second ear of the user;
    an in-ear speaker coupled to the audio interface for providing an in-ear audio signal to the second ear of the user, in response to the filtered signal and the second input signal;
    an in-ear microphone for sensing a sensed audio signal; and
    a processor for updating an impulse response of the adaptive filter in order to reduce a contribution of the leakage signal to the sensed audio signal.

11. The earpiece of claim 10, wherein the sensed audio signal further comprises an ambient noise and wherein the processor is configured to update the impulse response as to reduce the contribution of the ambient noise.

12. The earpiece of claim 10, further comprising an amplifier for amplifying the first input signal so as to compensate an attenuation applied to the first input signal while propagating through a bone.

13. The earpiece of claim 10, wherein the processor is configured to update the impulse response in response to an error, wherein the error is calculated by subtracting the second input signal from the picked up in-ear signal.

14. The earpiece of claim 10, wherein the processor is configured to calculate coefficients of a required impulse response, based of the error, so as to minimize the error.

15. The earpiece of claim 10, wherein the audio interface comprises a wireless receiver for receiving the audio signal from a wireless audio device.

16. The earpiece of claim 10, wherein the audio interface comprises an analog interface for receiving the audio signal from a wired audio device with an analog transmitter.

17. The earpiece of claim 10, wherein the audio interface comprises a digital interface for receiving the audio signal from a wired audio device with a digital transmitter.

18. The earpiece of claim 10, wherein the first input signal differs from the second input signal.

19. The earpiece of claim 10, wherein the first input signal equals to the second input signal.

20. A method for providing an audio signal to two ears of a user by using a single earpiece, comprising:
    receiving a first input signal;
    sending the first input signal to a first ear of a user by a bone conduction speaker;
    providing an inner ear audio signal to a second ear of the user, by an in-ear speaker, in response to a second input signal; wherein the first input signal the second input signal are desired signals and do not include ambient noise;

sensing, by an in-ear microphone that is proximate to the second ear of the user, a sensed audio signal;

wherein the sensed audio signal is affected by the inner ear audio signal and by another signal that represents an interference audio signal that is heard by the second ear of the user; and calculating a compensating signal that once provided to the bone conductor speaker will cause the bone conductor speaker to output an output signal that reduces an audio effect of the interference audio signal on the first ear of the user.

21. The method of claim 20, wherein the interference audio signal is an ambient noise.

22. The method of claim 21, wherein the compensating signal that is provided to the bone conductor speaker will cause the bone conductor speaker to output an output signal that cancels the audio effect of the ambient noise.

23. The method of claim 21, wherein the calculating of the compensating signal is responsive to a user defined noise reduction factor, such that the reduction of the audio effect of the ambient noise is responsive to the user defined noise reduction factor.

24. The method of claim 20 further comprises closing the first ear of the user by an earplug as to improve a signal to noise in the first ear due to an occlusion effect.

25. An earpiece, comprising:
an audio interface for receiving a first input signal and a second input signal; wherein the first input signal the second input signal are desired signals and do not include ambient noise;
an in-ear speaker for providing an inner ear audio signal to a second ear of a user, by the in-ear speaker, in response to the second input signal;
a bone conduction speaker for providing the first input signal to a first ear of the user;
an in-ear microphone that is proximate to the second ear of the user, for sensing a sensed audio signal; wherein the sensed audio signal is affected by the inner ear audio signal and another signal that represents an interference audio signal that is heard by the second ear of the user; and
a processor for calculating a compensating signal that once provided to the bone conductor speaker will cause the bone conductor speaker to output an output signal that reduces an audio effect of the interference audio signal on the first ear of the user.

26. A phone providing audio signals to two ears of a user, comprising:
a bone conduction speaker for outputting, based on a first input signal, an audio signal to a first ear of the user; wherein the outputting of the audio signal to the first ear by the bone conduction speaker causes a leakage signal to reach a second ear of a user;
an adaptive filter with an adjustable impulse response for filtering the first input signal to provide a filtered signal that once played to the second ear of the user by an in-ear speaker reduces an audio effect of the leakage signal on the second ear of the user;
an in-ear speaker coupled to an audio interface for providing an in-ear audio signal to the second ear of the user, in response to the filtered signal and a second input signal;
wherein the first input signal the second input signal are desired signals and do not include ambient noise;
an in-ear microphone for sensing a sensed audio signal; and
a processor for updating an impulse response of the adaptive filter in order to reduce a contribution of the leakage signal to the sensed audio signal.

27. A headset, comprising:
an audio interface for providing an audio signal that comprises a first input signal and a second input signal; wherein the first input signal the second input signal are desired signals and do not include ambient noise;
a first in-ear speaker for providing, when positioned in a first ear of the user, a first inner ear audio signal to the first ear of a user, in response to the first input signal;
a second in-ear speaker for providing, when positioned in a second ear of the user, a second inner ear audio signal to the second ear of the user, in response to the second input signal;
at least one in-ear microphone that is proximate to the first ear of the user, for sensing a sensed audio signal; wherein the sensed audio signal is affected by the first inner ear audio signal and another signal that represents a second audio signal that is heard by the first ear of the user; and
a processor for calculating a compensating signal that once provided to the in-ear speakers will cause the in-ear speakers to output an output signal that reduces an audio effect of the second audio signal.

28. The method of claim 1, further comprises amplifying the first input signal, by a gain factor, so as to mask at least part of the ambient noise that is heard by the first ear of the user.

29. The earpiece of claim 10, further comprising an amplifier for amplifying the first input signal so as to mask at least part of the ambient noise that is heard by the first ear of the user.

30. The method of claim 1, further comprises closing the first ear of the user by an earplug as to improve a signal to noise in the first ear due to an occlusion effect.

31. The earpiece of claim 10, further comprising an earplug for closing the first ear of the user as to improve a signal to noise in the first ear due to an occlusion effect.

32. An earpiece for providing an audio signal to two ears of a user, comprising:
an audio interface for providing an audio signal that comprises a first input signal and a second input signal; wherein the first input signal the second input signal are desired signals and do not include ambient noise;
a bone conduction speaker coupled to the audio interface for outputting an output signal; wherein the outputting of the output signal causes an audio signal to reach a first ear of a user and causes a leakage signal to reach a second ear of the user;
an adaptive filter with an adjustable impulse response for filtering the first input signal to provide a filtered signal that once played to the second ear of a user, by an in-ear speaker, reduces an audio effect of the leakage signal on the second ear of the user; and
a processor for updating an impulse response of the adaptive filter in order to reduce a contribution of the leakage signal to the sensed audio signal.

* * * * *